(12) United States Patent
McBurney et al.

(10) Patent No.: US 11,248,694 B2
(45) Date of Patent: Feb. 15, 2022

(54) APPARATUS FOR TRANSMITTING TORQUE VIA A WELD

(71) Applicant: SCHAEFFLER TECHNOLOGIES AG & CO. KG, Herzogenaurach (DE)

(72) Inventors: Craig McBurney, Wooster, OH (US); Justin Persinger, Wadsworth, OH (US)

(73) Assignee: Schaeffler Technologies AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/794,916

(22) Filed: Feb. 19, 2020

(65) Prior Publication Data
US 2021/0254703 A1    Aug. 19, 2021

(51) Int. Cl.
*F16H 57/02* (2012.01)
*F16B 35/04* (2006.01)
*F16H 57/031* (2012.01)
*F16B 35/06* (2006.01)
*F16H 45/00* (2006.01)

(52) U.S. Cl.
CPC .......... *F16H 57/031* (2013.01); *F16B 35/06* (2013.01); *F16H 45/00* (2013.01)

(58) Field of Classification Search
CPC ........ F16C 45/00; F16C 57/031; F16B 35/04; F16B 35/06; F16H 45/00; F16H 57/031
See application file for complete search history.

(56) References Cited

U.S. PATENT DOCUMENTS

| | | | | |
|---|---|---|---|---|
| 1,953,305 A * | 4/1934 | Maclean | ............... | F16B 35/048 411/399 |
| 2,199,809 A * | 5/1940 | Pigott | ................... | F16B 33/002 411/399 |
| 2,929,270 A * | 3/1960 | Tuck | ..................... | F16H 47/085 475/47 |
| 4,096,711 A * | 6/1978 | Carlson | ..................... | F16D 3/77 464/99 |
| 4,946,420 A * | 8/1990 | Jackel | ............... | F16F 15/13142 464/7 |
| 5,172,608 A * | 12/1992 | Schultz | ................. | F16B 37/041 464/68.92 |
| 6,435,758 B1 * | 8/2002 | Hinkel | .................... | F16H 41/24 403/282 |
| 6,745,563 B1 * | 6/2004 | Shue | ....................... | F16D 33/20 60/345 |
| 8,616,816 B2 * | 12/2013 | Pieciak, Jr. | .......... | F16B 25/0073 411/411 |
| 9,303,700 B2 * | 4/2016 | Lindemann | ............. | F16D 33/18 |
| 9,683,644 B2 * | 6/2017 | Smith | ..................... | F16D 33/18 |
| 9,709,147 B2 * | 7/2017 | Steinberger | .............. | B60K 6/38 |

(Continued)

FOREIGN PATENT DOCUMENTS

WO   WO-2015189132 A1 * 12/2015 .............. F16B 2/005
WO   WO-2019197501 A1 * 10/2019 ......... B29C 65/7841

*Primary Examiner* — Adam D Rogers
(74) *Attorney, Agent, or Firm* — Rutan & Tucker LLP; Hani Z. Sayed

(57) ABSTRACT

A torque converter in a vehicle includes a cover for the torque converter, wherein the cover includes a front surface and a back surface and a stud including a head and an end with a shaft therebetween passing through an opening of a flex plate, wherein the head includes a top surface and a bottom surface, wherein the top surface include an annular projection penetrating the front surface of the cover and the bottom surface is adjacent the shaft.

19 Claims, 3 Drawing Sheets

(56) References Cited

U.S. PATENT DOCUMENTS

| | | | | |
|---|---|---|---|---|
| 10,247,222 B2* | 4/2019 | Bertovic | ............ | F16B 35/06 |
| 2016/0305524 A1* | 10/2016 | Resh | ............ | F16H 41/24 |
| 2021/0129666 A1* | 5/2021 | Persinger | ............ | B60K 23/02 |

* cited by examiner

APPARATUS FOR TRANSMITTING TORQUE VIA A WELD

TECHNICAL FIELD

The present disclosure relates to torque converters, including studs that may be utilized to keep certain components of torque converters intact.

BACKGROUND

Studs and stud welds may be utilized to keep the flex plate or drive plate of a transmission in contact with a torque converter, in particular the torque converter cover. In certain situations, stud welds and weld quality may not perform efficiently. Forces that alternate back and forth like the engine firing and compression strokes induce fatigue on the joint which may lead to failure.

SUMMARY

According to one embodiment, a torque converter in a vehicle includes a cover for the torque converter, wherein the cover includes a front surface and a back surface and a stud including a head and an end with a shaft therebetween, wherein the head includes a top surface and a bottom surface, wherein the top surface includes an annular projection penetrating the front surface of the cover and the bottom surface is adjacent the shaft.

According to another embodiment, a stud includes a head and an end with a shaft therebetween, wherein the head includes a top surface and a bottom surface, wherein the top surface includes an annular projection penetrating the front surface of the cover and the bottom surface is adjacent the shaft.

According to yet another embodiment, a torque converter in a vehicle includes a cover of the torque converter, wherein the cover includes a front surface and a back surface, a flex plate configured to transfer torque from a power source to the front surface of the cover of the torque converter, and a stud including a head and an end with a shaft therebetween, wherein the head includes an annular projection penetrating a flex plate in contact with the torque converter and the front surface of the cover.

DETAILED DESCRIPTION

Figure 1:
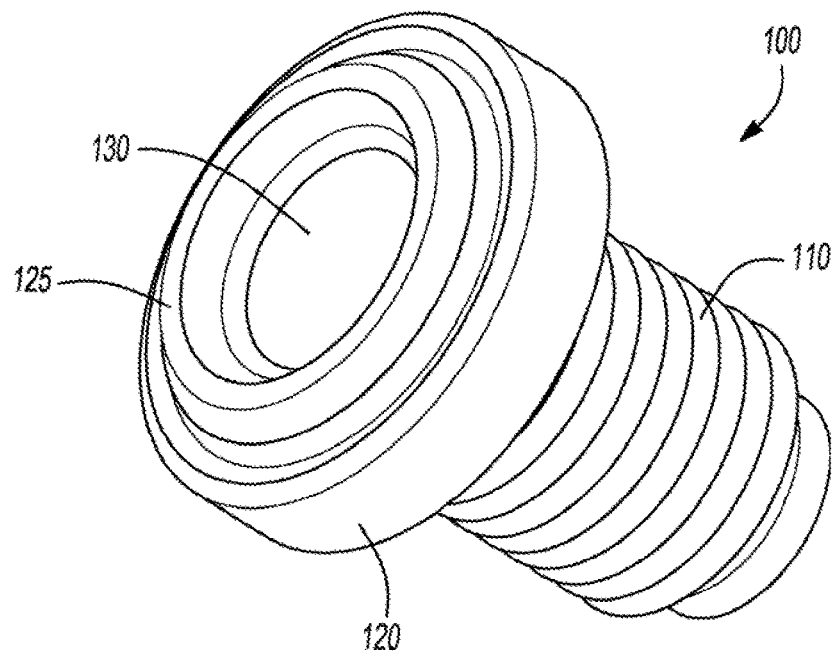
FIG. 1 is a perspective view of a stud 100.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made.

In the disclosure of the embodiment discussed below, an implementation of a stud may be in such a way that the stud and base (e.g., head) of the stud passes through the flex plate (e.g., drive plate) allowing the flex plate to rest directly on the cover, given that previous iterations may utilize a separate material (e.g., separate pad) between the flex plate and torque converter cover. The stud may be welded on by utilizing resistance welding of the projections of the stud to the torque converter cover. Any type of weld may be utilized, including a capacitive weld (e.g., capacitive discharge resistance weld). In an alternative embodiment, a retention device, such as nut or any other type of fastener, may be fastened down to compress the flex plate to the torque converter cover. The retention device may produce the preload required to resist the torque that is being input into the system via the flex plate. Depending of flatness or axial distance requirements, capabilities of manufacturing, and architecture, an alternative embodiment may include a raised pad to limit the amount of surface that is contacting the drive plate reducing the amount of surface that needs to be machined to meet a tight flatness specification requirement. Additionally a raised pad on the torque converter cover can be used to fill in axial space as required.

The stud embodiment described below may be simpler to manufacture because it has less material than traditional studs, which in turn allows it to be manufactured at a reduced cost. Additionally, the stud reduces the amount of metal in the projections as compared to previous designs, which thereby reduces the current and force that is required to weld both the stud and cover together. Thus, the embodiment described below may reduce or eliminate one group of welds that can be significantly out of sync with another group of projections, which would lead to weld defects or failures. The disclosed embodiment may also eliminate the need for a floating pad to be utilized at the time of assembly and may be used to reduce axial packaging requirements, but may have flexibility to accommodate current axial height. The design may also improve the ratio of weld-grounding area relative to the projection area that is trying to be weld, which in turn would improve weld quality. Thereby, eliminating the bending moment from the weld. Furthermore, it may eliminate or mitigate the shear force from the weld. This in turn effectively subjects the weld to a static force and prevents all fatigue inducing forces from acting on the weld.

The stud may torque down against the flex plate, clamping the flex plate down directly to the cover, directly transferring bending moments into a relatively ductile, un-heat effected region of the cover. The exterior of the torque converter cover (e.g., front surface of the torque converter cover) may be stamped sufficiently flat or otherwise machined flat to provide a mounting interface for the flex plate.

FIG. 1 is a perspective view of a stud 100. As shown in FIG. 1, the stud may include a shaft 110. The shaft 110 may include a plurality of teeth or threading that can be further secured via a retention device such as a nut, as shown in other embodiments. The stud 100 may also include a head 120 that is at one end of the shaft 110. The head 120 may have a width or diameter that is larger than the shaft 110. In one embodiment, the width or diameter of the head 120 is 2.5 times larger than that of the shaft 110. In another embodiment, the width or diameter of the head 120 may be the same size as the shaft 110 or 4 times larger than the shaft. The head 120 may include one or more projections 125 that are utilized to secure the various components of a torque converter, such as a flex plate (e.g., drive plate) to a torque converter cover. The projections 125 and the head 120 may thus be welded onto a front surface of a cover of a torque converter. Any type of weld may be utilized, including a capacitive weld (e.g., capacitive discharge resistance weld). While FIG. 1, shows that several projections 135 may be utilized, any number of projections may suffice, including one annular projection running around the outer edge of the head 120.

Figure 2A:
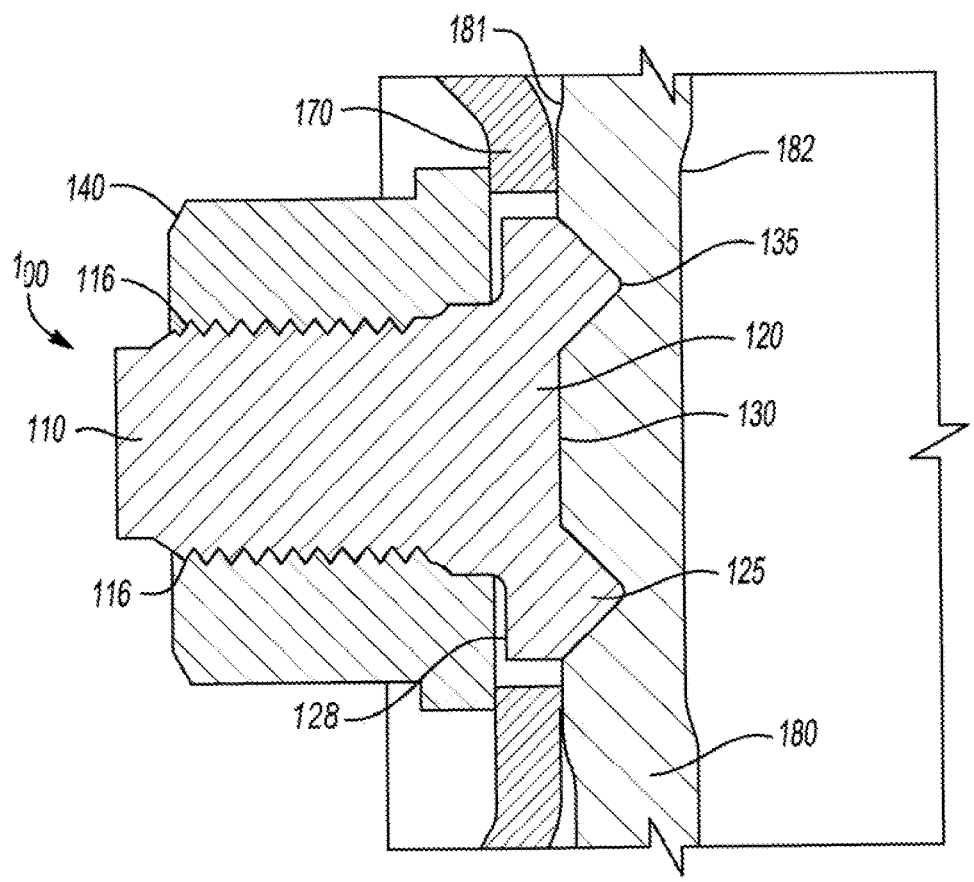
FIG. 2A is a side cross-sectional view of a stud 100 utilized in a flex plate and torque converter cover.

FIG. 2A is a side cross-sectional view of a stud 100 utilized in a flex plate and torque converter cover. One or more studs 100 may be utilized to secure the flex plate 170 to the torque converter cover 180. In one embodiment, four studs 100 may be utilized to secure the flex plate 170 to the torque converter cover 180. The flex plate may configured to transfer torque from a power source to the front surface 181 of the cover of the torque converter. The front surface 181 of the cover 180 may be opposite of a back surface 182 of the cover. The front surface 181 may be in contact with the flex plate 170. The power source may include an engine or motor. Torque may be transferred from the engine coming off the crank shaft, but in an electric motor the torque could be coming off an output shaft or flange, for example. The flex plate 170 may include openings that are utilized to receive the stud 100. The flex plate 170 may include one opening, two openings, three openings, four openings, or any other number of openings, etc. The openings of the flex plate 170 may allow the stud 100 to be inserted through. The shaft of the stud 100 may be inserted through to the opening in the flex plate 170, which allows a bottom surface of the head of the stud to be against a top surface of the flex plate 170 (e.g., the surface facing the torque converter cover 180). The apex 135 of the projection 125 may be rounded off or sharp (e.g., meet at a single point). The apex 135 may be formed when two opposite sides of the projection 135 meet. The opposite sides may be angled at 30 degrees, with a variance of plus or minus 2 degrees in one embodiment. However, the angle may be 30 degrees to 60 degrees, or any other angle. The head 120 of the stud 100 may be in contact with the torque converter cover 180.

Figure 2B:
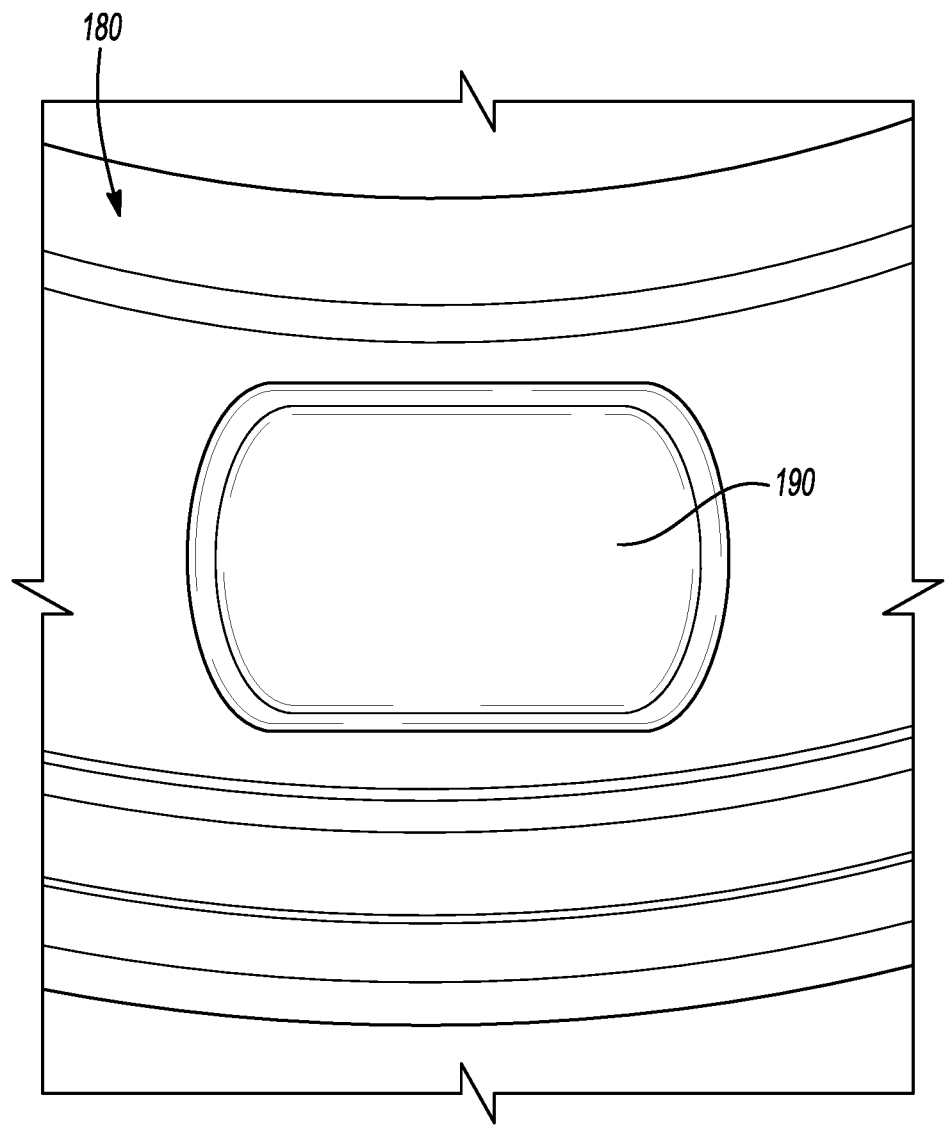
FIG. 2B is a detailed zoomed-view of a raised portion of the torque converter cover.

In an alternative embodiment, the torque converter cover 180 may include a raised pad portion 190. The raised pad portion 190 may be adjacent to the head 120 of the stud 100. Thus, the head 120 of the stud 100 may be in contact with the raised pad portion 190 in one embodiment. FIG. 2B shows a detailed view of the raised portion 190 of the torque converter cover. The raised portion 190 may be utilized to help secure the weld between the stud 100 and the torque converter cover 180. The raised portion 190 may be offset from the rest of the surface of the torque converter cover 180 by at least 0.5 millimeters. However, the raised portion 190 may be offset from the rest of the surface of the torque converter cover 180 by any portion. Depending of flatness/axial distance requirements, capabilities of manufacturing, and architecture, the alternative embodiment may include a raised pad to limit the amount of surface that is contacting the drive plate to reduce the amount of surface that needs to be machined to meet a tight flatness requirement. Additionally a raised pad on the torque converter cover can be used to fill in axial space if necessary, to eliminate any extra material between the flex plate and the torque converter cover and allow for direct contact of the head of the stud (e.g., the projections), the flex plate, and the torque converter cover.

Figure 3:
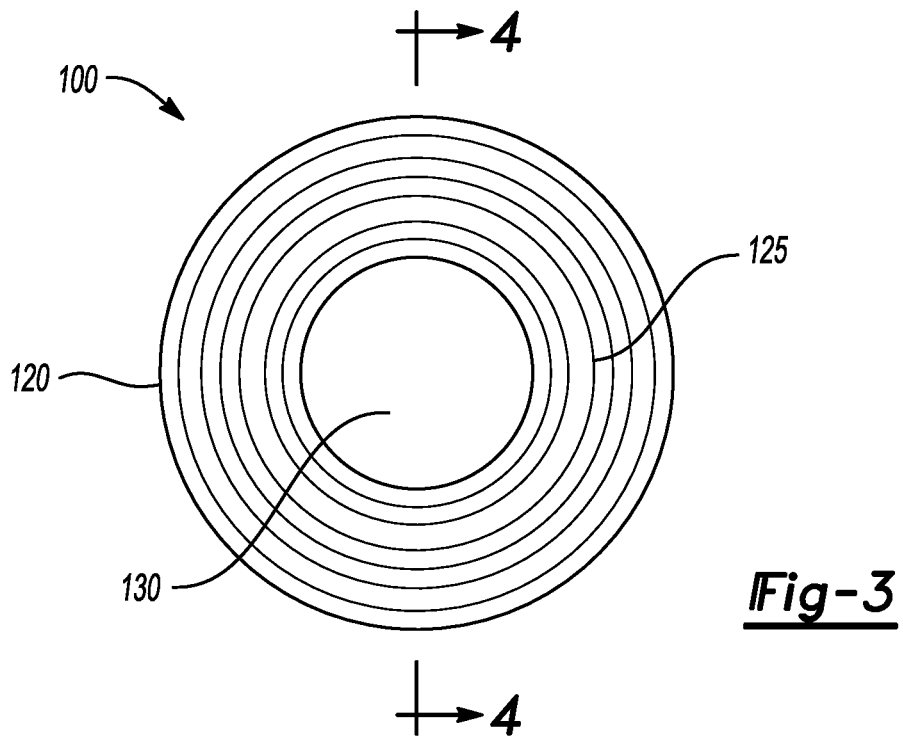
FIG. 3 is a front view of the base (or head) of the stud.

FIG. 3 is a front view of the base (or head) of the stud. The head 120 may include multiple projections 125 or simply one projection. The projection 125 may be located at the outer most edge of the head 120. Within the projection 125, which may be annular and circulate the entire circumference of the head 120, may be an inner portion 130. The inner portion 130 may be defined by an inner diameter of the annular projection 125. The outer diameter of the annular projection 125 may thus be in contact with the outer edge of the head 120 in one embodiment. In another embodiment, the outer diameter of the annular projection 125 may not rest on an outer edge of the head 120 and may instead be offset, as shown in more detail in FIG. 4 below. The inner portion 130 may be relatively flat or may include a raised or lowered top surface. In other embodiments, the head 120 may be round or circular, however, the head 120 may be square or any other shape in another embodiment.

Figure 4:
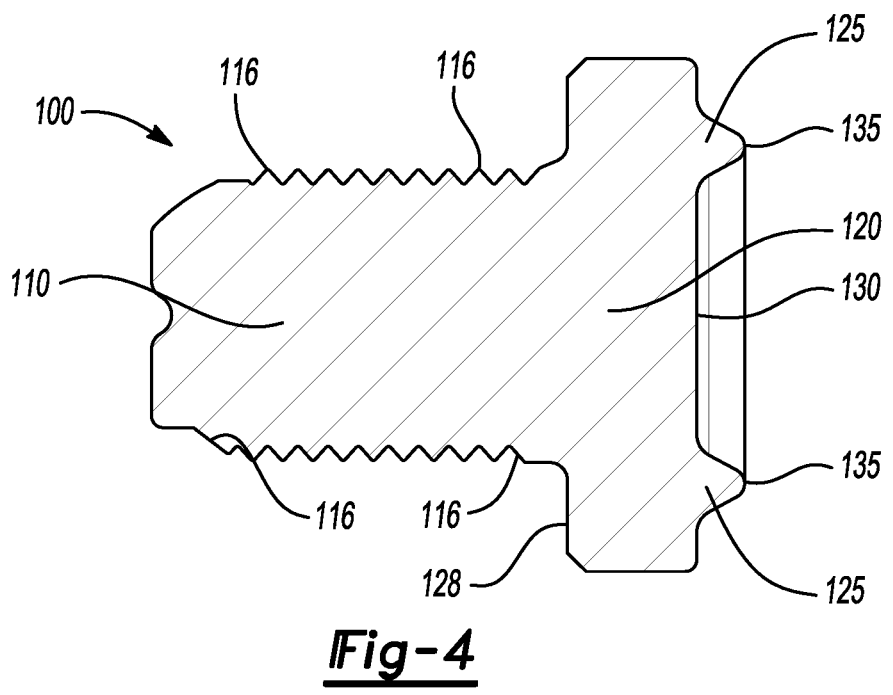
FIG. 4 is an embodiment of a stud with the annual projection offset from a top and bottom portion of the head of the stud.

FIG. 4 is an embodiment of a stud with the annular projection offset from a top and bottom portion of the head 120 of the stud 100. In this embodiment, the annular projection 125 may be offset from an outer edge (which may be viewed as a top or bottom portion in a side cross sectional). Thus, the annular projection 125 may not meet with the outer edge or outer circumference of the head 120. An inner portion of the head 120 may be the surface area that is surrounded by the annular projection 125. The inner portion of the head 120 may be substantially flat, rounded off, bumpy, include teeth, or be any type of uneven surface. When the annular projection 125 that protrudes from the head 120 is offset from the outer edge of the head 120, the inner portion may occupy less surface area on the top surface of the head 120.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. For example, the width, diameter, angles, ratios, and other dimensions described above are not limited to the examples provided and that a person of ordinary skill in the art would understand that other ratios could be used based on design constraints. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST

100—Stud
110—Shaft
116—Teeth
120—Head
125—Projection
128—Bottom Surface of Head
130—Inner Portion of Head
135—Apex
140—Fastener
170—Flex Plate
180—Torque Converter cover
181—Front Surface
182—Back Surface
190—Raised Portion

What is claimed is:

1. A torque converter in a vehicle comprising:
a cover of the torque converter, wherein the cover includes a front surface and a back surface;
a flex plate configured to transfer torque from a power source to the front surface of the cover of the torque converter;
a stud including a head and an end with a shaft therebetween, wherein the head includes an annular projection projecting away from the flex plate in contact with the front surface of the cover, wherein the annular projection includes an apex that projects from a top surface from the head in a direction away from the end, wherein the top surface is further from the end of the stud compared to a bottom surface of the head; and
wherein the shaft is engaged with a fastener that may be fastened down to compress the flex plate to the cover for the torque converter.

2. The torque converter of claim 1, wherein the flex plate is compressed directly against the front surface of the cover of the torque converter at an area adjacent the top surface of the head of the stud.

3. A torque converter in a vehicle comprising:
a cover for the torque converter, wherein the cover includes a front surface and a back surface; and
a stud including a head and an end with a shaft therebetween, wherein the stud is configured to pass through an opening of a flex plate,
the head comprising a bottom surface intersecting the shaft and a top surface axially spaced from the bottom surface and the shaft,
wherein the top surface includes an annular projection penetrating the front surface of the cover, and wherein the annular projection projects from the top surface and in a direction away from the shaft, and the top surface of the head is in direct contact with the front surface of the cover; and
wherein the shaft is engaged with a fastener that may be fastened down to compress the flex plate to the cover for the torque converter.

4. The torque converter of claim 1, wherein the shaft of the stud includes a plurality of teeth.

5. The torque converter of claim 1, wherein the annular projection is in contact with an outer edge of the head of the stud.

6. The torque converter of claim 1, wherein the annular projection is not in contact with an outer edge of the head of the stud.

7. The torque converter of claim 1, wherein the cover includes a raised portion that is offset from the front surface of the cover.

8. The torque converter of claim 1, wherein the annular projection includes an apex.

9. The torque converter of claim 8, wherein the apex is in contact with the front surface.

10. The torque converter of claim 1, wherein the head is projection welded onto the front surface of the cover.

11. The torque converter of claim 1, wherein the head is capacitive welded onto the front surface of the cover.

12. The torque converter of claim 1, wherein the annular projection is not in contact with an outer edge of the head of the stud, wherein the annular projection defines an inner portion of the head.

13. The torque converter of claim 1, wherein the top surface of the head is in contact with an area adjacent the opening of the flex plate.

14. A stud of a torque converter, comprising:
a head and an end with a shaft therebetween, wherein the head includes a top surface facing away from the shaft and a bottom surface facing toward the shaft, wherein the top surface includes one or more annular projections extending therefrom in a direction away from the shaft and penetrating a front surface of a cover of the torque converter, wherein the bottom surface of the head does not include any projections, and wherein the bottom surface is adjacent the shaft and the top surface is furthest from the end, wherein the shaft includes a plurality of teeth arranged annularly along the shaft and engaged with a fastener arranged against a flex plate of the torque converter; and
wherein the fastener that may be fastened down to compress the flex plate to the cover for the torque converter.

15. The stud of claim 14, wherein the one or more annular projections protrude from the top surface at the head at approximately a 30-degree angle.

16. The stud of claim 14, wherein the one or more annular projections surround the top surface, wherein the top surface is substantially flat.

17. The stud of claim 14, wherein the one or more annular projections surround an uneven portion of the top surface of the head.

18. The torque converter of claim 17, wherein the cover includes a raised portion that is offset from the front surface of the cover.

19. The torque converter of claim 17, wherein the annular projection is in contact with an outer edge of the head of the stud.

* * * * *